UNITED STATES PATENT OFFICE.

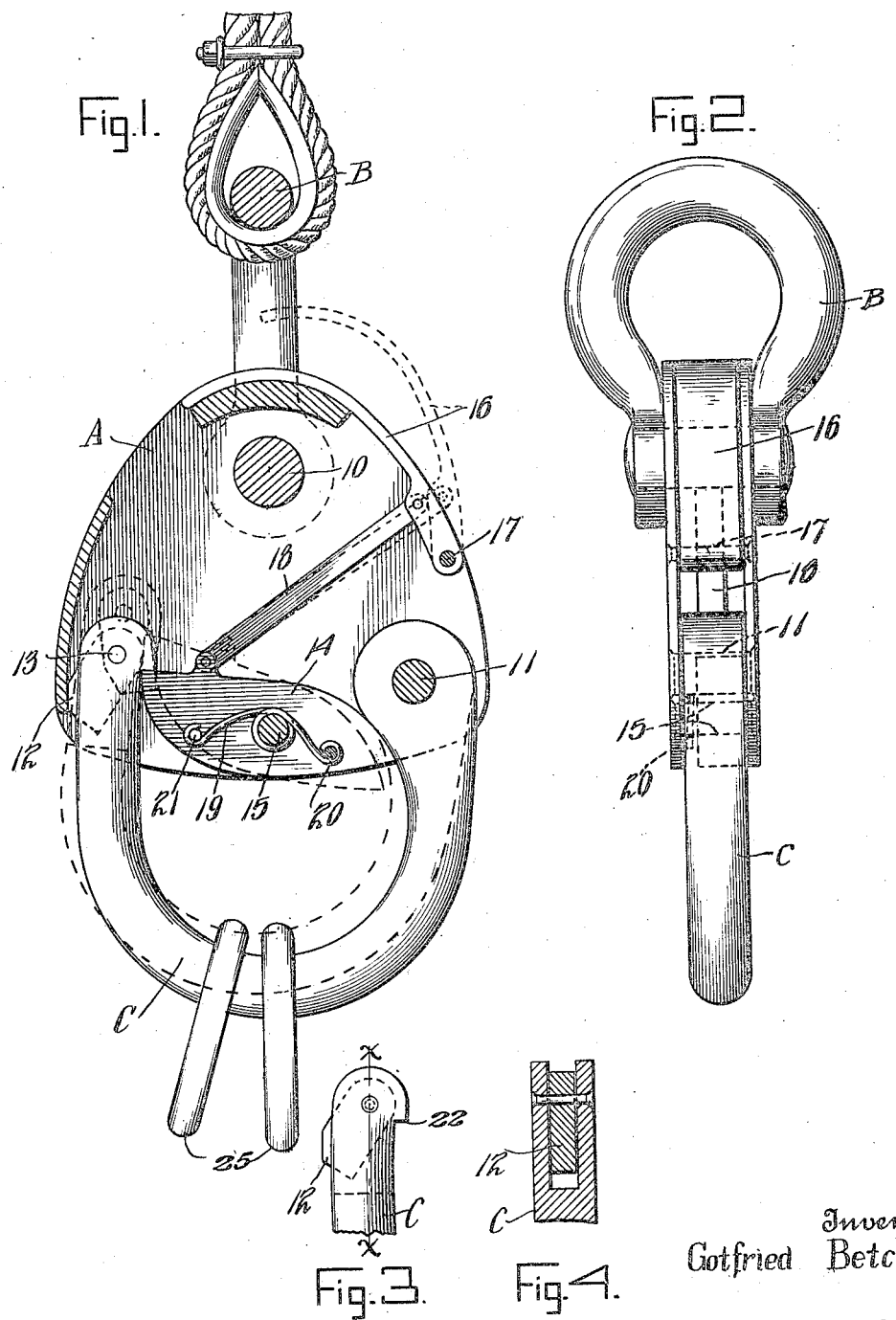

GOTFRIED BETCHER, OF PORTLAND, OREGON.

LOGGING HOOK.

1,423,301. Specification of Letters Patent. Patented July 18, 1922.

Application filed August 5, 1920. Serial No. 401,344.

*To all whom it may concern:*

Be it known that I, GOTFRIED BETCHER, a citizen of Russia, residing at Portland, in the county of Multnomah and State of Oregon, have invented certain new and useful Improvements in Logging Hooks, of which the following is a specification.

My said invention consists in certain improvements in the details of construction and arrangement of parts of hooks or shackles intended for attaching the cable connected with the power apparatus with the load, such as required in logging operations, unloading hay, etc., whereby such a hook is provided which may be very readily and conveniently connected and disconnected with the load-carrying device and at the same time insure a connection that will not become accidentally disconnected or broken in use, all as will be hereinafter more fully described and claimed.

Referring to the accompanying drawings, which are made a part hereof and on which similar reference characters indicate similar parts, Figure 1 is a sectional view through a hook or shackle embodying my said invention, Figure 2 an edge elevation thereof, and Figure 3 a detail of the end of the hook, and Figure 4 a section on line *x—x* of Figure 3.

In said drawings, the portions marked A represent the frame or housing, B the link for connecting with the power, and C the hook for connecting with the load.

The frame or housing A is preferably composed of two sides spaced apart and secured together or formed all in one piece, substantially as shown.

The link B is mounted on a pivot 10 which extends through said housing and through the ends of said link and has the cable connected thereto which is connected to the motor or other power mechanism.

The hook C is mounted on a pivot 11 which extends through one side of said housing and at its other end is slotted and has a pivoted member 12 for a purpose to be presently described mounted on a pivot 13 therein. A pivoted latch 14 is mounted on a pivot 15 in housing A between the ends of said hook when in closed position. An operating lever 16 is mounted on a pivot 17 and connected by a connecting rod 18 with said latch. A spring 19 connected at one end with a pin 20, secured in the housing, and the other end with a pin 21, secured in latch 14, serves to normally hold said latch in open position.

In operation, the rings or links 25 connected with the load-carrying cable are mounted on hook C and the hook turned on its pivot 11 until its end carrying the member 12 extends to within the housing, substantially as indicated by dotted lines at the left in Figure 1. Latch 14 is then thrown to a horizontal position so that its upper edge, as shown at the left in Figure 1, will engage under the catch 22 on the inner end of hook C. The hook is thus locked and when the strain comes upon said hook, the strain of the downward pull on the end opposite pivot 11 is brought upon the latch 14, the opposite end of which is forced under such strain to bear against the inner side of the enlarged eye portion of the pivoted end of the hook and thus said free end is rigidly supported by said latch against all such strain. The greater the load the heavier will be the strain increasing the security of the lock effected by said member 14. The point of member 14 at the same time forces pivoted member 12 outward to bear against the casing and thus support hook C against spreading under the strain and at the same time permit sufficient clearance between the end of the hook and the casing to allow freedom in operation. When the load has been brought to rest and the cable is slackened, then hook C may be turned further inward on its pivot 11, as indicated by dotted line, and the latch 14 released through the medium of lever 16, as will be readily understood.

By these means, a very secure and at the same time comparatively inexpensive hook is provided and one that may be easily and conveniently operated.

Having thus fully described my said invention, what I claim as new and desire to secure by Letters Patent, is:

1. In a device of the character described, the combination of a housing, a hook mounted therein and pivoted at one end, a pivoted member adapted to engage both ends of the hook and to support the hook at its free end, and means for operating said pivoted member, substantially as set forth.

2. In a device of the character described, the combination of a housing, a hook pivoted at one end in said housing, a member pivoted in the free end of said hook, a latch member pivoted in said housing between the ends of said hook when in normally closed position, one end of said latch being adapted to engage with the catch on the closed hook and force said pivoted member outward and the other end to rest against the opposite side of the closed hook, and means for operating said latch member, substantially as set forth.

3. A device of the character described comprising a housing, a pivoted hook in said housing, a supporting member pivoted in the free end of said hook, a latch member pivoted in said housing and adapted to engage at one end with said member and a catch on the hook and at the other end to rest against the other side of said hook, a spring for normally holding said latch member open, and a lever and connection for operating said latch member, substantially as set forth.

4. A device of the character described comprising a housing, a link pivoted in said housing for connection with the power, a hook pivoted at one end in said housing and provided with a catch at its free end, a supporting member pivoted between the ends of said hook when in normal closed position and adapted to engage under said catch, and means for operating said pivoted member, substantially as set forth.

5. In a device of the character described, the combination of a housing, a hook mounted therein and pivoted at one end, a pivoted member adapted to engage both ends of the hook and to support the hook at its free end, an operating lever pivoted to the housing, a link connecting the operating lever with the said pivoted member and means for holding the free end of the hook spaced from the housing, substantially as set forth.

6. In a device of the character described, the combination of a housing, a hook mounted therein and pivoted at one end, a device attached to the free end of the hook for preventing the hook from spreading in the housing and also for holding the said end of the hook spaced from the housing, and means to operate said device, substantially as set forth.

7. In a device of the character described, the combination of a housing, a hook mounted therein and pivoted at one end, a pivoted latch for engaging the other end of said hook, a member pivoted on the free end of the hook adapted at times to bear against the housing and prevent the hook from spreading, and means for operating the said latch member, substantially as set forth.

8. In a device of the character described, the combination of a housing, a hook mounted therein and pivoted at one end, a pivoted latch for engaging the other end of said hook, a member pivoted on the free end of the hook adapted at times to bear against the housing and prevent the hook from spreading, and means for operating the said latch member to permit the said pivoted member to become disengaged from the housing and to permit the hook to be withdrawn therefrom, substantially as set forth.

In witness whereof, I have hereunto set my hand and seal at Portland, Oregon, this 15th day of July, A. D. nineteen hundred and twenty.

GOTFRIED BETCHER. [L. S.]

Witnesses:
ASHBY C. DICKSON,
DORIS KELLY.